United States Patent [19]

Meier et al.

[11] Patent Number: 5,596,633

[45] Date of Patent: Jan. 21, 1997

[54] CHARGER/DETECTOR FOR CORDLESS TELEPHONES

[75] Inventors: Rolf G. Meier, Carp; Michael C. Rehder, Kanata; Peter Bligh, Kanata; Chris Butler, Kanata, all of Canada

[73] Assignee: Mitel Corporation, Ontario, Canada

[21] Appl. No.: 321,239

[22] Filed: Oct. 11, 1994

[30] Foreign Application Priority Data

Oct. 12, 1993 [CA] Canada .................................. 2108225

[51] Int. Cl.⁶ .................................................. H04M 11/00
[52] U.S. Cl. .......................... 379/201; 379/207; 379/210
[58] Field of Search ..................................... 379/201, 207, 379/211, 210, 376, 396

[56] References Cited

U.S. PATENT DOCUMENTS

| | | | |
|---|---|---|---|
| 4,852,156 | 7/1989 | Shigenaga | 379/172 |
| 4,878,238 | 10/1989 | Rash et al. | 379/62 |
| 4,932,050 | 6/1990 | Davidson | 379/211 |
| 5,153,906 | 10/1992 | Akiyama | 379/112 |
| 5,197,092 | 3/1993 | Bamburak | 379/59 |
| 5,363,425 | 11/1994 | Mufti | 379/38 |
| 5,379,319 | 1/1995 | Satoh | 379/387 |

FOREIGN PATENT DOCUMENTS

| | | | |
|---|---|---|---|
| 0264092A2 | 10/1987 | European Pat. Off. | H04M 3/42 |
| 0578374A1 | 1/1994 | European Pat. Off. | H04M 11/00 |
| 1399508 | 7/1975 | United Kingdom | H04Q 7/00 |
| 2222503 | 3/1990 | United Kingdom | H04Q 7/04 |
| WO93/10616A1 | 5/1993 | WIPO | H04M 11/00 |

*Primary Examiner*—Krista M. Zele
*Assistant Examiner*—Thomas F. Presson
*Attorney, Agent, or Firm*—Charles E. Wands

[57] ABSTRACT

The present invention relates to a subscriber presence detector system comprised of a switching system for connecting calls to and from a plurality of lines, a person presence detector connected to a line, for providing an indication to the switching system that a person is adjacent or not adjacent the detector, and apparatus for routing calls to the line in the event an indication has been received by the switching system that a person is adjacent the line.

9 Claims, 2 Drawing Sheets

| SUB NO. | CORRELATED LINE NO. |
|---|---|
| 591 2345 | 591 2345 |
| 591 2346 | 591 4687 |
| 591 2347 | 591 2347 |
| 591 2348 | * |
FIG. 2
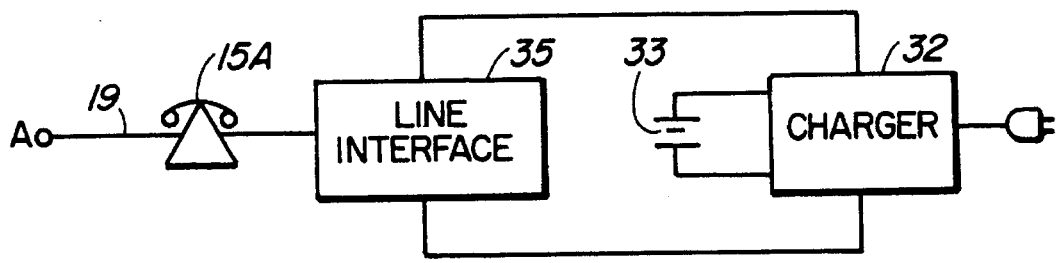
FIG. 3
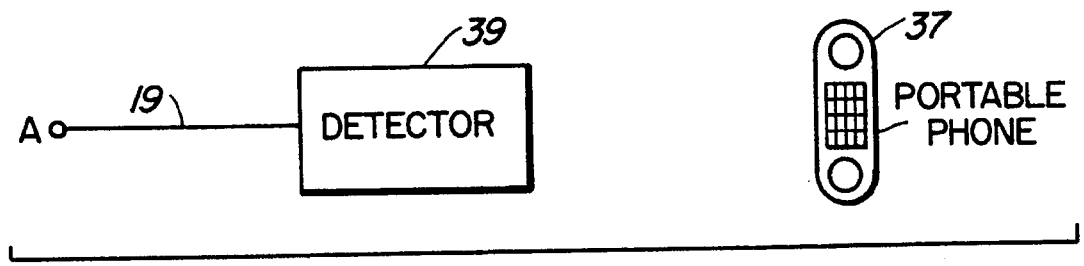
FIG. 4

5,596,633

CHARGER/DETECTOR FOR CORDLESS TELEPHONES

FIELD OF THE INVENTION

This invention relates to communications systems and in particular a system which detects the presence of a subscriber adjacent a telephone line and as a result routes calls to that telephone line, or performs other duties such as security, controlling certain operations of the communication system, etc.

BACKGROUND TO THE INVENTION

As subscribers demand more enhanced services of the telephone company related to their personal mobility, this places demands on the telephone system which reduces its efficiency. For example, if a subscriber is absent from his usual location adjacent a telephone line (i.e. telephone set), and forgets to inform the operator or the telephone system of his absence, incoming calls to the telephone line will cause the telephone to ring for an extended period of time, annoying other persons who may be within ear shot of the ringing, and wasting valuable telephone system resources, such as the ringing generator, the peripheral control system, etc.

Ringing to a hunt group has the objective of transferring an incoming call to a location in which a person who might answer the telephone is present. If no person is absent, however, various hunt groups can be rung for an extended period of time before any person, answers a ringing telephone. This can also waste precious time of the caller, and the wasted time could be dangerous if the call is an emergency call, for example.

SUMMARY OF THE INVENTION

The present invention is a system which detects the presence of a person adjacent a telephone and routes calls to that telephone. The detector can detect either the presence of any person, or the presence of a particular person. The presence detector can be enabled by a physical act of a person, such as inserting a portable handset into its charger, by inserting a card into a card reader, or by detecting the presence of a person by using an e.g. infrared detector in the vicinity of the detector. The person can be carrying or wearing an unique identification device such as a magnetically coded tag which identifies the individual and which is detected by a magnetic field generator and detector. Alternatively the person can be carrying a transmitter for detection by the detector.

In accordance with an embodiment of the invention, a subscriber presence detector system is comprised of a switching system for connecting calls to and from a plurality of lines, a person presence detector connected to a line, for providing an indication to the switching system that a person is adjacent or not adjacent the detector, apparatus for routing calls to the line in the event an indication has been received by the switching system that a person is adjacent a line.

In accordance with another embodiment, a subscriber presence detector system is comprised of a switching system for connecting calls to and from a plurality of lines, for providing an indication to the switching system that a person is either adjacent or not adjacent the detector, apparatus for enabling a security device by the switching system upon the switching system receiving the indication that a person is adjacent the detector.

In an embodiment of the invention, the detector system detects that a specific person is adjacent a line, informs the switching system, which routes incoming calls to a number associated with the specific person to the line, where he has been detected. The detector could detect a bar code attached to a wireless handset, data on a magnetic stripe imprinted on a plastic card, a coded magnetic strip carried on a person or handset, or any other way of detecting the presence of a specific person.

BRIEF INTRODUCTION TO THE DRAWINGS

A better understanding of the invention will be obtained by reference to the detailed description below, in conjunction with the following drawings, in which:

FIG. 2 illustrates the content of part of a memory within the switching system which incorporates the present invention, and FIGS. 3 and 4 are block diagrams of a part of the system of FIG. 1 in accordance with a second and a third embodiment.

DETAILED DESCRIPTION OF THE INVENTION

Figure 1:
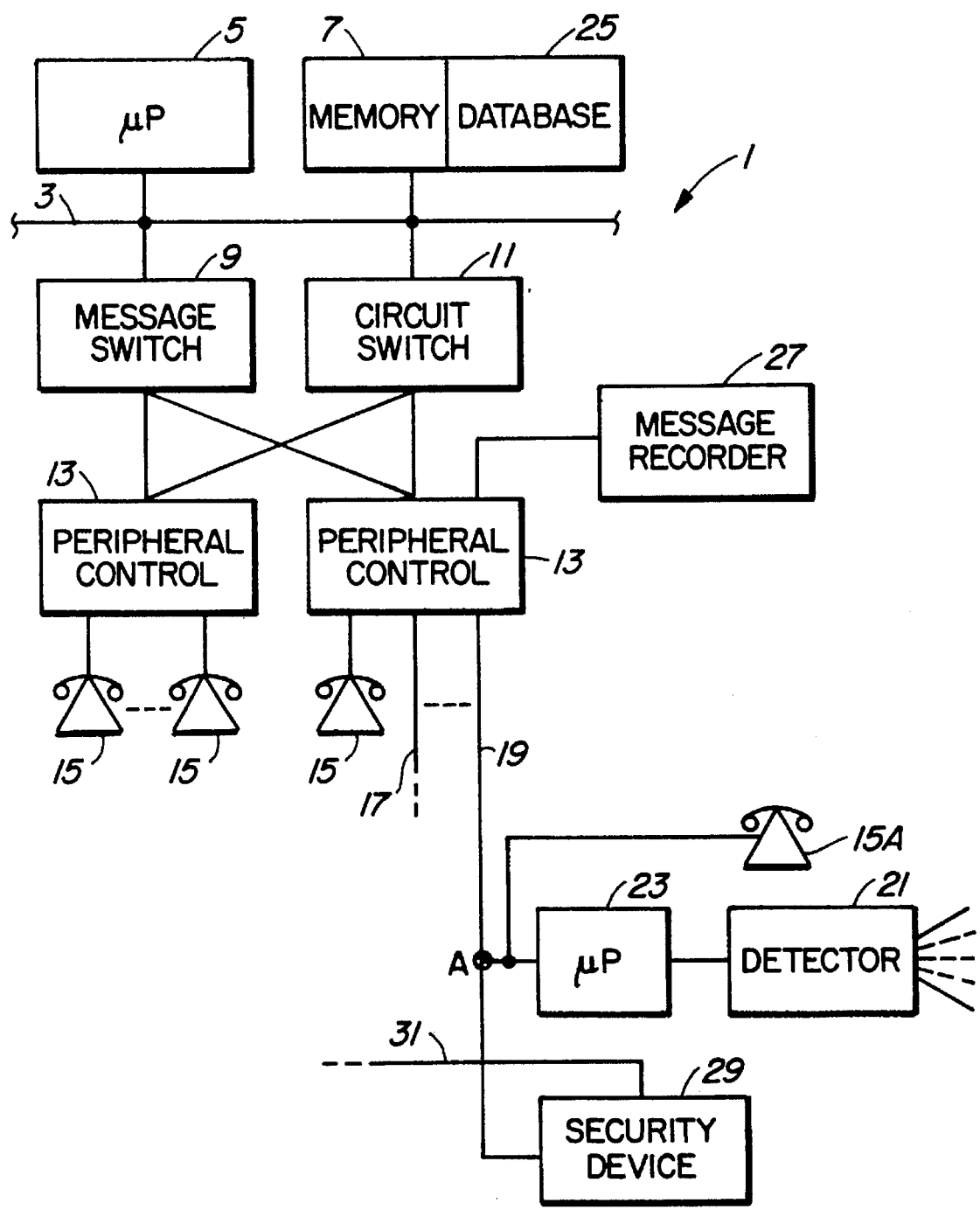
FIG. 1 is a block diagram of a preferred embodiment of the system invention.

A communications switching system 1 forms one of the elements of the present invention, and can be of a type similar to that described in U.S. Pat. No. 4,616,360 issued Oct. 7th, 1986, invented by Conrad Lewis. Such a system is generally formed of a main bus 3 to which a microprocessor 5 and a main memory 7 are connected. A message switch 9 and a circuit switch 11 are connected to bus 3 for Control by microprocessor 5, and are connected to peripheral control systems 13 to which peripherals such as telephone sets 15 and trunks 17 are connected.

Shown in more detail is one of the telephone lines 19 to which a telephone set 15A is connected. A person detector 21, located adjacent telephone set 15A, is connected to microprocessor 23, which is connected to telephone line 19.

With reference to FIG. 2, memory 7 contains a database 25 which includes a listing of all of the subscriber numbers, correlated to telephone lines and a correlated line number to each of the subscriber numbers, which designate other telephone lines. For example, the first and third subscriber numbers correlate to corresponding numbers, while the second correlates to a different telephone line number. This will be used in a manner to be explained in more detail below.

Detector 21 can be an infrared detector commonly used for home security and can detect either the presence of a body having size over a particular threshold, or can be a movement detector in which variations of the detected infrared signal are utilized as presence indication signals. Those signals are passed to microprocessor 23 which formulates a "person present" code. This signal is applied to line 19, is received by peripheral control 13, is passed to message switch 9, which passes it to microprocessor 5. Microprocessor 5 places a "person present" indication in data base 25.

When detecting an incoming call, microprocessor 5 checks database 25 to determine whether there is a "person present" indicator in database 25. If it has detected such a mark, it causes the call to be processed in a normal manner, eventually causing ringing of telephone line 15A, connection of the call through circuit switch 11, and allocation of subscriber call features to telephone set 15A.

However if the subscriber has departed from the region of detector 21, this is also noted by microprocessor 23, and it formulates a "person absent" signal, passing it via line 19 to peripheral control 13, a "person absent" mark being eventually stored in database 25. A "person absent" signal can be the removal of a "person present" signal.

Upon receiving an incoming call to telephone set 15A, microprocessor 5 looks up the subscriber line number in database 25 and finds that the subscriber is absent. It then refrains from proceeding to ring telephone set 15A. If the switching system is set up with an automated message recording system, microprocessor 5 can cause it to be connected to the incoming line, requesting the caller to leave a message.

Alternatively, the incoming call can be routed to an operator.

When the subscriber returns to the vicinity of detector 21, his presence causes an output signal detector 21 to cause microprocessor 23 to output a "person present" signal to line 19, and as described before, changing the line status content of database 25 against the line number. Microprocessor 5, receiving the "person present" indication from the telephone line can check for received messages from message recorder 27, and if any messages are present, can cause telephone set 15A to ring, and upon the telephone set going off-hook, the downloading of messages or the synthetic provision of a message advising that messages may be retrieved under control of the subscriber.

Alternatively the telephone system can ring the operator, and advise the operator either by synthetic voice or by indication on a terminal screen that the subscriber has returned.

If the switching system is e.g. a PABX or key telephone system, it may be switched into night service. Typically in night service all calls are routed either to a single telephone or to a hunt group. When the PABX is switched back into day service, it can monitor each telephone line which has a person present detector, to indicate to the operator that the user of the extension has or has not arrived for the day yet. In this manner, the operator may automatically receive an indication of which of the extension subscribers are available to receive calls. Once that indication has been stored in database 25, the system can operate as described above, or as will be described below.

The system can be programmed so that when it is placed into a night service, all calls are routed to extensions for which there is a person present indicator stored in database 25. When the last person leaves the vicinity of the detector 21, the PABX can switch all calls to an automatic voice system which advises callers that the establishment is closed.

The system can be programmed to ring only the first person in a hunt group who is actually adjacent his detector, and therefore adjacent his telephone. This allows the system to direct incoming calls directly to persons who can in fact answer their telephones, instead of directing calls to telephone sets in various hunt groups which do not answer after ringing a predetermined number of times, or instead of ringing night bells.

The system is thus made more efficient than current communication systems.

For example, if a person, such as a telephone agent who is required to be at his telephone leaves his telephone, after microprocessor 5 receiving a message from microprocessor 23 that the agent has left the telephone, a timer incorporated in or accessed by microprocessor 5 can ring the telephone line of a supervisor who might need to be aware of a medical need of the agent, for example.

For use in a hotel, when a guest arrives back in his room, the person is detected by detector 21 and if there are messages waiting, the room telephone can be rung to deliver the messages to the hotel guest.

A security device 29 can be connected to telephone line 19. Thus for example, if a factory, building or company has closed for the evening or weekend or for other reasons, upon detection of a person by detector 21 and the transmission of the appropriate code to the switching system 1, the switching system 1 can send a code to the security device 29, enabling it. The security device can be an amplified microphone which transmits peripheral sounds via line 19 or via another line 31 to a recording device, to a loudspeaker adjacent a security guard, etc. The switching system 1 can ring a security guard and can connect the amplified microphone thereto.

Alternatively, security device 29 can be a video camera or both a video camera and amplified microphone which can provide at least one of sound and image of the environment around the detector.

There are other ways of detecting the presence of a subscriber than the detector 21. For example the subscriber may have a portable telephone which has a rechargeable battery. As shown in FIG. 3, when the portable telephone is placed in its charger 32, the rechargeable battery 33 causes the charger to provide a signal to a line interface 35. The signal is generated in a similar manner as such chargers enable an LED indicator thereon. Line interface 35 generates the "subscriber present" signal and applies it to subscriber line 19, to which telephone set 15A may or may not be connected. One function of telephone set 15A, if present, is to apply the "subscriber present" signal to line 19 in a digital format, if used, if it is a digital telephone set. Otherwise if line interface 35 performs all such functions, telephone set 15A need not be present.

The presence of the portable telephone set in the charger 32 is the equivalent of detecting the subscriber in the vicinity of detector 21, causing switching system 1 to operate in a manner as described above, in all respects.

As shown in FIG. 4, a portable telephone 37 can contain an infrared transmitter which is enabled when it is placed on a counter top, or when a button is pushed on it. Alternatively a radio or some other signal could be used to signal its presence. Detector 37 detects the presence of portable telephone 37 providing the "subscriber present" signal to switching system 1.

Preferably the signal which is sent from portable phone 37 to detector 37 is specific to a subscriber; each portable phone will have a different transmitting address. In this manner the switching system 1 can keep track of the location of various portable phones within the environment of e.g. a PABX or a wider area. Thus when the address is transmitted from portable phone 37 to detector 39, and is transmitted from peripheral control 13 to microprocessor 5, the database 25 is changed to mark the subscriber number of the portable telephone (e.g. 591-2346) against the correlated line number (e.g. 591-4687) which can be used to ring the particular portable phone if there is an incoming call to the portable phone number 591-4687, and to supply all features to be provided to the subscriber, such as a speed calling list, etc.

In this manner the telephone system can automatically detect the presence of the various portable phones without the requirement for the subscriber to inform the switching system of his location.

While a wireless link has been described to inform the microprocessor as to the location of the portable phone, other means may be used. For example, with regard to the embodiment shown in FIG. 3, when the portable phone is placed in charger 32, a bar code carried by the portable phone can be read by a bar code reader in the charger. The bar code can, for example, be carried on a sticker attached to the side of a portable phone.

Alternatively, the detector 39 could contain a magnetic stripe card reader, with a magnetic stripe carried by the portable phone or by a credit card size piece of plastic.

As another alternative, the portable phone and/or the person can carry an encoded magnetic tag which is read by a magnetic field reader. A tag of this type, which can identify specific persons, and a field generator and reader, are described in U.S. Pat. No. 4,686,165 issued Aug. 11th, 1987, invented by Ezequiel Mejia and U.S. Pat. No. 4,663,612 issued May 5th, 1987, invented by Ezequiel Mejia et al which are incorporated herein by reference.

A person understanding this invention may now conceive of alternative structures and embodiments or variations of the above. All of those which fall within the scope of the claims appended hereto are considered to be part of the present invention.

We claim:

1. A subscriber presence detector system comprising:
   (a) a switching system for connecting calls to and from a plurality of lines,
   (b) a person presence detector connected to a line, for automatically providing an indication to the switching system that a particularly identified person is adjacent or not adjacent said detector,
   (c) means for storing said indication at the switching system comprised of an identity of the particular subscriber,
   (d) means for enabling a security device by said switching system upon the switching system receiving and storing said indicating that said identified person is adjacent said detector, and
   (e) the security device being at least one of an amplified microphone and a video camera disposed adjacent said line, and further including a separate transmission medium for transmission of at least one of sounds and images at a remote location from said at least one of an amplified microphone and video camera of said security to a monitoring location.

2. A system as defined in claim 1 in which the person presence detector is comprised of means for detecting unique identities of wireless telephones as identities of particular subscribers and for providing indications of said unique identities to the switching system.

3. A system as defined in claim 2, including means in the switching system registering said unique identities, and for routing incoming calls for specific subscriber members associated with unique identities of the telephones to the lines with which said unique identities have been detected.

4. A system as defined in claim 2 including means for enabling special services at said line related to a specific subscriber if a specific person present indication has been received by said switching system.

5. A system as defined in claim 2 including means for enabling special services at said line if a person present indication has been received by said switching system.

6. A system as defined in claim 1 in which the detector is comprised of a bar code reader located in a portable telephone charger, and further including a bar code fixed to a portable phone in a readable location by the bar code reader when the portable phone is placed in the charger.

7. A system as defined in claim 6 in which the bar code is formed as one of an optically readable UPC bar code label and a magnetic strip.

8. A system as defined in claim 1 in which the detector is comprised of a magnetic code detector and further comprising a magnetic element for carriage by said person, expressing said magnetic code.

9. A system as defined in claim 1 including means for enabling special services at said line related to a specific subscriber if a specific person present indication has been received by said switching system.

* * * * *